(12) United States Patent
Naden

(10) Patent No.: US 7,057,635 B1
(45) Date of Patent: Jun. 6, 2006

(54) HIGH-SPEED RF LINK FOR A MULTI-USER MEETING

(75) Inventor: Rex A. Naden, Los Gatos, CA (US)

(73) Assignee: Atheros Communications, Inc., Sunnyvale, CA (US)

( * ) Notice: Subject to any disclaimer, the term of this patent is extended or adjusted under 35 U.S.C. 154(b) by 0 days.

(21) Appl. No.: 09/492,728

(22) Filed: Jan. 27, 2000

(51) Int. Cl. 
H04N 7/14 (2006.01)

(52) U.S. Cl. .............. 348/14.02; 348/14.08; 348/14.05; 348/734; 348/744; 345/169; 379/93.21

(58) Field of Classification Search .. 348/14.01–14.02, 348/14.05, 14.13, 734, 744, 14.08, 14.09; 345/158, 169; 379/93.08, 93.17, 93.19, 93.21; 704/500; H04N 7/14
See application file for complete search history.

(56) References Cited

U.S. PATENT DOCUMENTS

| | | | |
|---|---|---|---|
| 5,025,314 A * | 6/1991 | Tang et al. ............. | 348/14.08 |
| 5,204,768 A * | 4/1993 | Tsakiris et al. ......... | 359/148 |
| 5,374,952 A * | 12/1994 | Flohr ................... | 348/14.08 |
| 5,397,133 A * | 3/1995 | Penzias ................. | 463/22 |
| 5,491,508 A * | 2/1996 | Friedell et al. ........ | 348/14.02 |
| 5,534,914 A * | 7/1996 | Flohr et al. ........... | 348/14.01 |
| 5,539,658 A * | 7/1996 | McCullough ............. | 345/730 |
| 5,611,038 A * | 3/1997 | Shaw et al. ............ | 345/716 |
| 5,657,246 A * | 8/1997 | Hogan et al. ........... | 348/14.1 |
| 5,760,824 A * | 6/1998 | Hicks, III ............. | 348/14.02 |
| 5,767,897 A * | 6/1998 | Howell ................. | 348/14.07 |
| 5,818,616 A * | 10/1998 | Kawai .................. | 398/72 |
| 5,831,664 A * | 11/1998 | Wharton et al. ......... | 348/13 |
| 5,832,065 A * | 11/1998 | Bannister et al. ....... | 379/88.13 |
| 5,864,708 A * | 1/1999 | Croft et al. ........... | 710/1 |
| 5,918,012 A * | 6/1999 | Astiz et al. ........... | 345/744 |
| 5,924,013 A * | 7/1999 | Guido et al. ........... | 725/67 |
| 5,926,208 A * | 7/1999 | Noonen et al. .......... | 348/14.1 |
| 5,933,597 A * | 8/1999 | Hogan .................. | 709/204 |
| 5,953,050 A * | 9/1999 | Kamata et al. .......... | 348/140.05 |
| 5,975,531 A * | 11/1999 | Rebec et al. ........... | 348/14.08 |
| 5,990,932 A * | 11/1999 | Bee et al. ............. | 348/14.08 |
| 6,011,579 A * | 1/2000 | Newlin ................. | 348/14.08 |
| 6,034,621 A * | 3/2000 | Kaufman ................ | 340/7.21 |
| 6,035,350 A * | 3/2000 | Swamy et al. ........... | 710/51 |

(Continued)

FOREIGN PATENT DOCUMENTS

EP 326263 * 2/1989

(Continued)

OTHER PUBLICATIONS

FCC 96-193 (Federal Communications Commission) NII/SUPERNet at 5 GHz, NPRM, ET Docket No. 96-102), pp. 1-25 (Appendix A pp. 1-5, Appendix B pp. 1-3).*

*Primary Examiner*—Brian P. Yenke
(74) *Attorney, Agent, or Firm*—Rosenberg, Klein & Lee

(57) ABSTRACT

A high-speed RF link connects multiple users with individual data appliances to a projection system in a multi-user meeting. The RF link enables high-speed transmission of graphics data in either compressed or uncompressed form to the projection system where application-aware software/hardware carries out any necessary de-compression before display of the graphics data. The RF link also enables high-speed links between multiple users and between one or more users and an external network via a wireline connection to the projection system. A user's capability may also be enhanced by the addition of a local keyboard and a local display.

32 Claims, 3 Drawing Sheets

U.S. PATENT DOCUMENTS

| | | | |
|---|---|---|---|
| 6,128,033 A * | 10/2000 | Friedel et al. | 348/14.04 |
| 6,160,573 A * | 12/2000 | Allen et al. | 348/14.08 |
| 6,297,843 B1 * | 10/2001 | Glew | 348/14.1 |
| 6,314,302 B1 * | 11/2001 | Haferbeck et al. | 348/14.01 |
| 6,356,934 B1 * | 3/2002 | Delph | 709/204 |
| 6,392,686 B1 * | 5/2002 | Kao et al. | 348/14.01 |
| 6,397,275 B1 * | 5/2002 | Clapp et al. | 710/60 |
| 6,411,988 B1 * | 6/2002 | Tafoya et al. | 709/204 |
| 6,434,403 B1 * | 8/2002 | Ausems et al. | 455/556.2 |
| 6,477,588 B1 * | 11/2002 | Yerazunis et al. | 710/13 |
| 6,574,674 B1 * | 6/2003 | May et al. | 719/310 |
| 6,657,654 B1 * | 12/2003 | Narayanaswami | 348/14.04 |
| 6,714,238 B1 * | 3/2004 | Urisaka et al. | 348/211.99 |
| 6,775,247 B1 * | 8/2004 | Shaffer et al. | 370/260 |
| 6,788,332 B1 * | 9/2004 | Cook | 348/14.02 |
| 6,844,893 B1 * | 1/2005 | Miller et al. | 348/14.1 |
| 6,847,391 B1 * | 1/2005 | Kassatly | 348/14.01 |
| 6,947,068 B1 * | 9/2005 | Forkner et al. | 348/14.07 |
| 6,972,786 B1 * | 12/2005 | Ludwig | 348/14.11 |
| 2001/0013890 A1 * | 8/2001 | Narayanaswami | 348/14.01 |
| 2001/0044321 A1 * | 11/2001 | Ausems et al. | 455/556 |
| 2002/0018117 A1 * | 2/2002 | Tosaya | 348/14.08 |
| 2002/0059481 A1 * | 5/2002 | Nunally | 710/5 |
| 2002/0130846 A1 * | 9/2002 | Nixon et al. | 345/169 |
| 2002/0154210 A1 * | 10/2002 | Ludwig et al. | 348/14.08 |
| 2002/0163578 A1 * | 11/2002 | Adair et al. | 348/158 |
| 2002/0197955 A1 * | 12/2002 | Witkowski et al. | 455/41 |

FOREIGN PATENT DOCUMENTS

JP    05196912    8/1993

* cited by examiner

HIGH-SPEED RF LINK FOR A MULTI-USER MEETING

BACKGROUND OF THE INVENTION

1. Field of Invention

The present invention relates to communications networks and more particularly to the use of a high-speed RF link for a multi-user meeting.

2. Description of Related Art

Digital projectors are becoming increasingly popular for use in business meetings. Typically, a single user connects his notebook or laptop computer, micro-laptop, or possibly an appliance such as a PDA (Personal Digital Assistant) to the digital projector by means of a cable, and the transmission is carried out using the VGA graphics electrical format. This VGA format is analog in nature and carries the equivalent of many Gbits/sec of digital information since the signal is uncompressed and therefore must communicate the full screen information (e.g., x-dim/pixel$^{1/2}$*y-dim/pixel$^{1/2}$*~24 color bits/pixel*60/sec refresh rate). For pixel dimensions of 640×480 and a refresh rate of 60 Hz, this leads to a transmission requirement of 640*480*24*60=~500 Mbits/sec. For pixel dimensions of 1024×1280 and a refresh rate of 72 Hz, the transmission rate is ~2.3 Gbits/sec.

Thus, the bandwidth currently required for connecting a user to a digital projector is quite high (e.g., over 1 Gbit/sec). However, the material generally presented (e.g., PowerPoint™ slides) may be transported in compressed form (e.g., object form) with high fidelity at lesser speeds (e.g., 10 to 100 Mbits/sec). Current approaches to a multi-user meeting with a digital projector do not incorporate application-sensitive bandwidth reduction by transmitting image data in its original object form and then converting the object data into a raster scanned digital image at the projector itself. Likewise, these approaches do not facilitate high-speed communication between multiple users and between a user and an external network.

In addition to the VGA standard, newer interface standards such as DVI (Digital Visual Interface) are becoming increasingly popular. The DVI standard, as popularized by Silicon Image, Intel, and others, has been standardized by the Digital Display Working Group (DDWG) to replace VGA for connections to digital projectors and flat panel displays. This interface consists of a cable comprising three data lines, each running at a rate over 1 Gbit/sec, plus a clock line for synchronization. Alternative standards for digital serial links have also been proposed.

According to either the VGA standard or the DVI standard, each user typically must communicate with the projector via a wired connection such as a cable. This connection requires the user be near the cable, and it limits the number of participants that can simultaneously use the projector, to typically one user. Such a wired connection has the further disadvantages of being by nature susceptible to a faulty physical connection, requiring considerable time to set up, and requiring a semi-skilled individual to make such connection.

Further, this wired arrangement limits the ability of the conferees who desire to communicate digitally with each other because they must resort to the use of floppy disks. In the case of Palm Pilot and other modern PDA's, inter-user communication may be accomplished by means of point-to-point infrared links, but such links are unreliable due to pointing accuracy and line-of-sight obstructions and are also limited in bandwidth. Further, this wired arrangement does not allow more than two conferees to communicate simultaneously and does not allow the conferees to communicate with fixed wired networks such as the local LAN or the Internet.

Emerging standards for wireless connections have also been limited. Bluetooth is an RF format that is designed to allow multiple users with portable machines such as PDA's or laptops to connect to each other or to multiple others on an ad-hoc basis. Such a network is limited in performance to less than 1 Mbit/sec bandwidth for each connection. This data rate is inadequate for conveying complex PowerPoint™ slides rapidly, and is completely inadequate for conveying future presentations that include video and audio information. Further, if multiple users share a Bluetooth channel, their individual data channels will be limited to much less than 1 Mbit/sec.

Thus, the bandwidth currently required for connecting a user to a digital projector creates challenges for both wireline and wireless systems, and current approaches typically do not facilitate high-speed transfer of graphics data over such a connection. Likewise, current approaches do not facilitate high-speed communication between multiple users or between a user and an external network.

SUMMARY OF THE INVENTION

Accordingly, it is an object of this invention to provide a high-speed RF link for a multi-user meeting.

It is a further object to provide a high-speed RF link for a multi-user meeting with multi-user control that enables high-speed links between a user and a projection system, between multiple users, and between users and external networks.

It is a further object to provide a high-speed RF link with application-aware conversion software to enable compressed and uncompressed transmissions of graphics, motion graphics, or video images.

The above and related objects are achieved by a system that includes at a least one data appliance, which may be manifest as a Personal Digital Assistant (PDA), and a projection system where an RF link between a transceiver in the data appliance and a transceiver in the projection system enables the transfer of graphical data for display. Transfer and display of graphical data is controlled centrally by the projection system.

According to a first aspect of the present invention, a communications and data display system includes a first data appliance and a projection system. The projection system includes a transceiver and a controller, and the first data appliance includes a transceiver. The transceiver of the first data appliance transfers graphical data to the transceiver of the projection system, and the projection system displays the graphical data where the transfer and the display of the graphical data is controlled by the controller.

Additional data appliances with transceivers may be added to the system, and communications between users at the data appliances may be carried out via the separate RF links between the data appliances and the projection system. The projection system may include a connection to an external network, and a user at a data appliance may communicate with the external network via the RF link to the projection system.

A data appliance may include a processing unit that allows transmission of uncompressed or compressed graphics files based on a control input that may come from a local keyboard. Additionally, a local display may be used by a user at a data appliance to preview a graphics file before transmission.

The projection system may include a graphics converter that converts compressed data to uncompressed data. This conversion may be done by application-aware software/hardware. A projector included in the projection system may display the graphics data by a variety of means. The graphics data is not restricted to static graphical images and may include motion graphics and video images.

The present invention enables a high-speed connection between a user at a data appliance and a projection system for a multi-user meeting. It additionally enables high-speed communication between multiple users at the meeting and between a user and an external network such as the Internet. At the same time, the present invention allows a system-level cost reduction by reducing the cost of the graphics chips in the data appliances.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, where.

DETAILED DESCRIPTION OF THE PRESENTLY PREFERRED EXEMPLARY EMBODIMENTS

Figure 1:
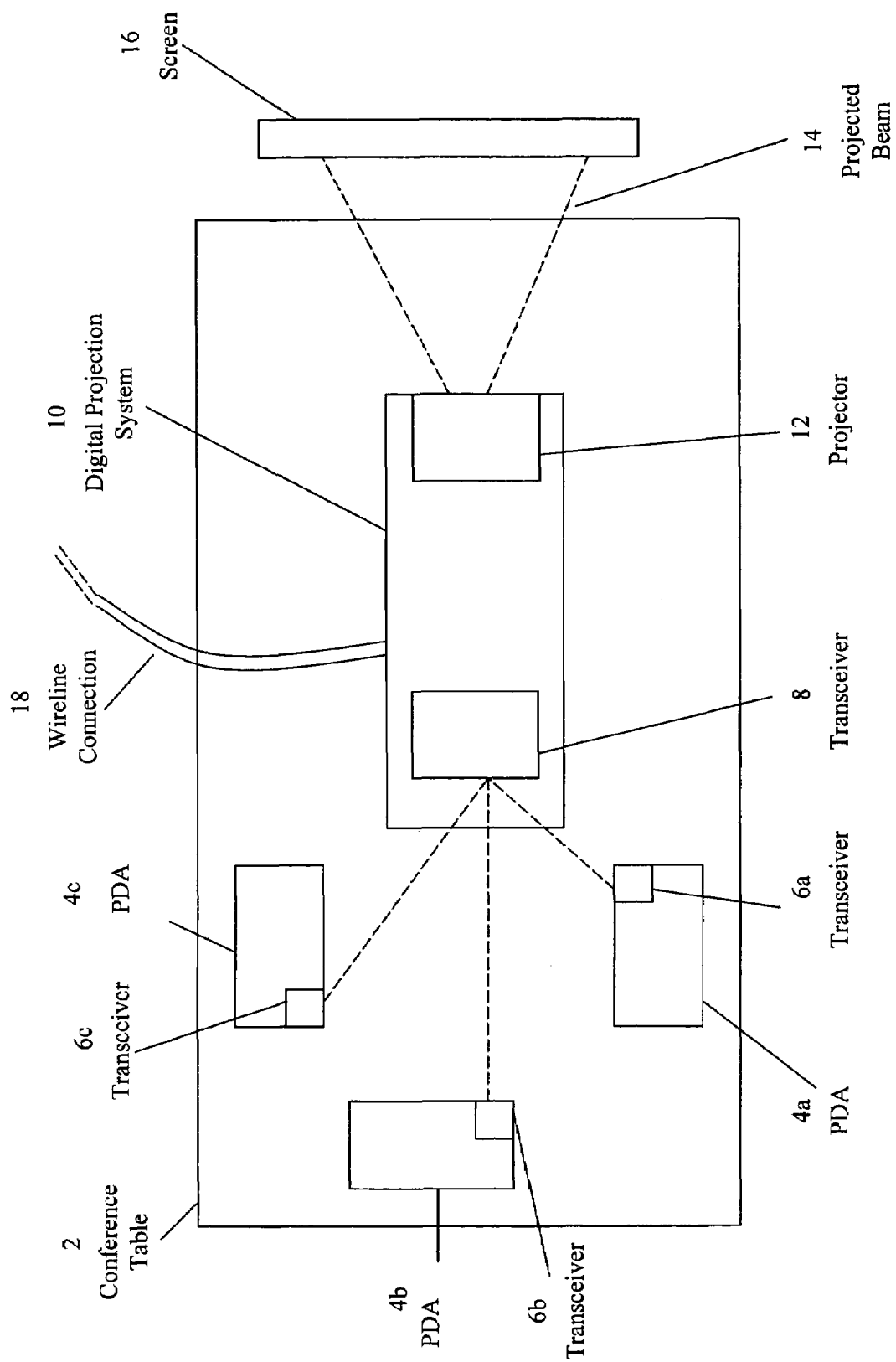
FIG. 1 illustrates a high-speed RF link for a multi-user meeting according to the present invention.

A high-speed RF link for a multi-user meeting according to the present invention is illustrated in FIG. 1. On a conference table 2 Three PDA's (or data appliances) 4a–4c are shown for three users although any number of users may be included. Each PDA 4a–4c also includes a transceiver 6a–c that can be used to communicate with a transceiver 8 belonging to a digital projection system 10. The digital projection system 10 is mounted on the conference table 2 so that a component projector 12 is oriented to provide a projected beam 14 that illuminates a screen 16. The digital projection system 10 also includes a wireline connection 18 to an external network such as the Internet, a LAN (local area network), or a WAN (wide area network).

Figure 2:
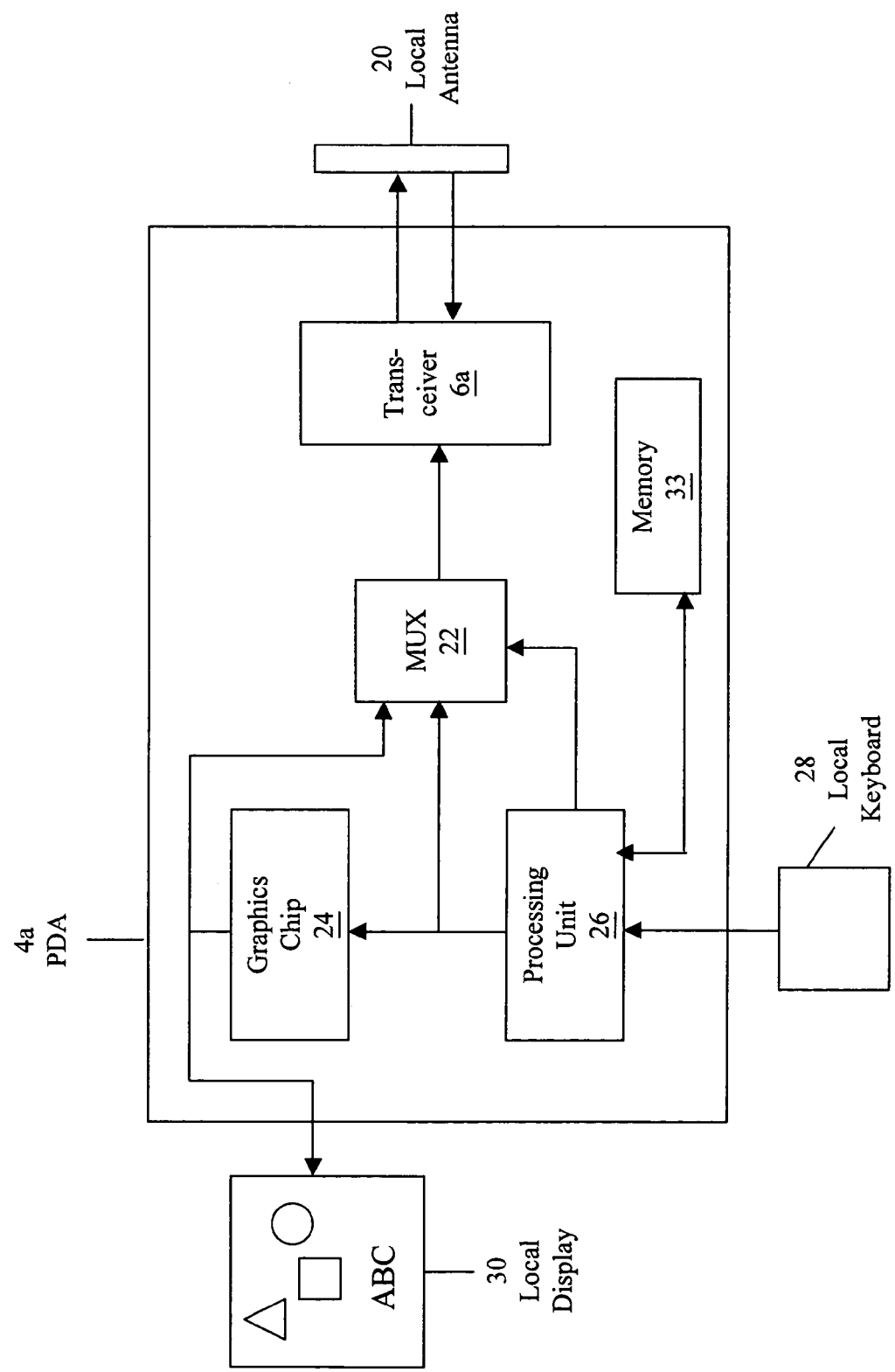
FIG. 2 illustrates details of a PDA (or data appliance) according to the present invention.

Additional components and interfaces of the first PDA 4a are illustrated in FIG. 2. The transceiver 6a connects with a local antenna 20 for RF communication and receives input from a MUX (multiplexer) 22. The MUX 22 receives input from a graphics chip 24 and a processing unit 26 that contains a CPU (central processing unit), memory and logic. A mass memory unit 33 for storing user data including for example presentation data is attached to the CPU. The processing unit 26 also takes input from a local keyboard 28, and the graphics chip 24 also provides output to a local display 30. The local display 30 can be used for example to display a PowerPoint™ slide that the user at the first PDA 4a wishes to review privately or it may be used to display a copy of the image shown on the screen 14.

Figure 3:
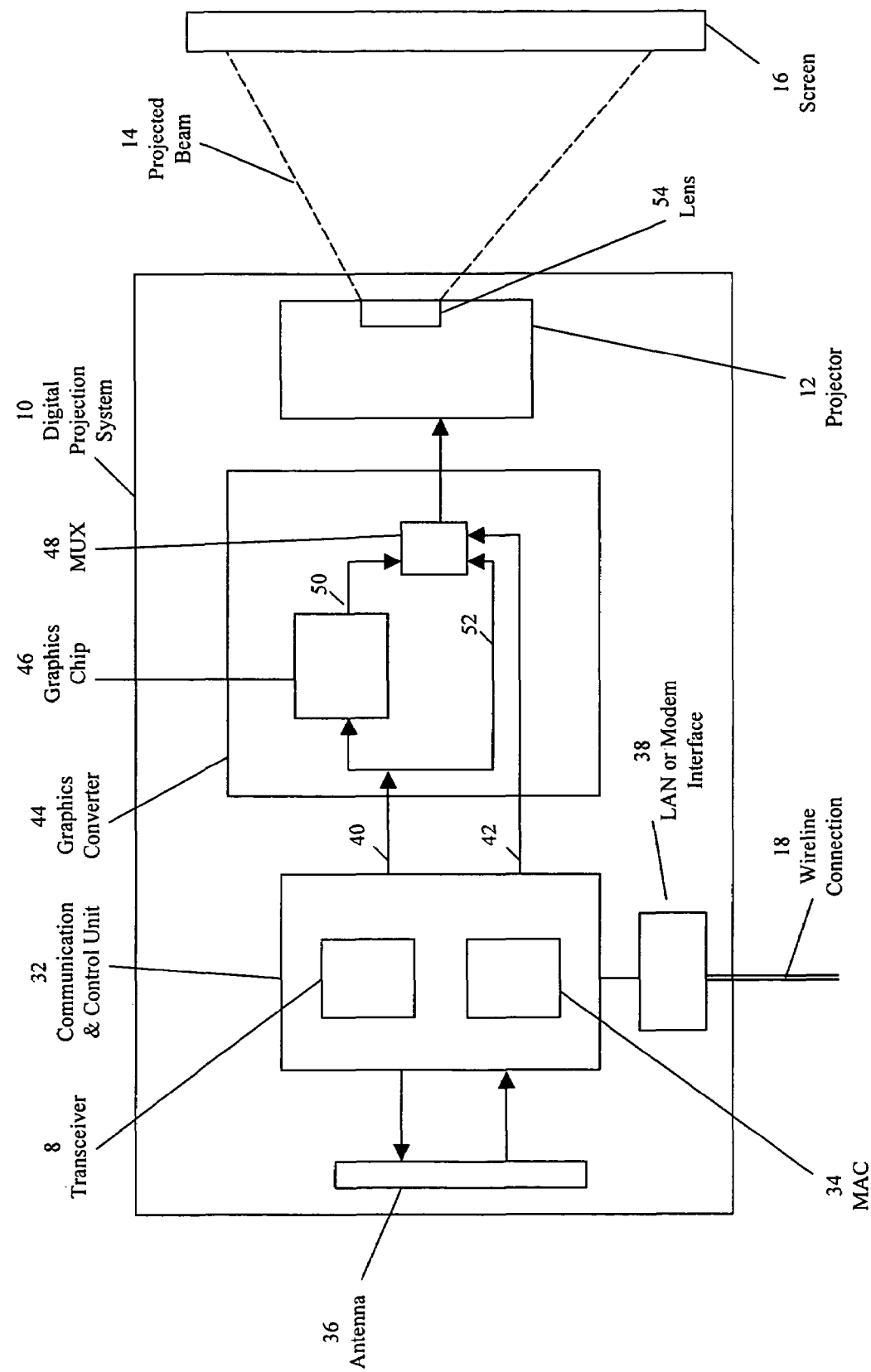
FIG. 3 illustrates details of a digital projection system according to the present invention.

Additional components and interfaces of the digital projection system 10 are illustrated in FIG. 3. A communication/control unit 32 includes the transceiver 8, which connects with an antenna 36 for RF communication, and a MAC (media access controller) 34, which includes software for multi-user control and functions as a central control unit. A LAN (local area network) or Modem interface 38 connects the communication/control unit 32 to the wireline connection 18. The communication/control unit 32 provides both a graphics data signal 40 and a control signal 42 to a graphics converter 44 that includes a graphics chip 46 and a MUX 48. The MUX 48 uses the control signal 42 to choose from graphics data, which may include data uncompressed 50 by the graphics chip 46 as well as direct graphics data 52. The graphics chip 46 includes application-aware object-to-raster conversion software that converts compressed object-based graphics data into conventional raster-scan data 50 suitable for the projector 12. The graphics converter 44 also includes a direct connection for uncompressed raster-scan data 52 to the projector 12. The projector 12, which has a lens 54, creates a projected beam 14 to display the image data on the screen 16.

The present invention provides for multiple high-speed RF links that can be used, for example, in a multi-user business meeting. First, a one-way link from the first PDA 4a to the projection system 10 can be effected by means of an RF link between the first-PDA transceiver 6a and the projection-system transceiver 8. Secondly, a two-way link between the first PDA 4a and the second PDA 4b can be effected by means of an RF link between the first-PDA transceiver 6a and the projection-system transceiver 8 and an RF link between the second-PDA transceiver 6b and the projection-system transceiver 8. Thirdly, a two-way link from the first PDA 4a to the wireline connection 18 to the Internet can be effected by means of an RF link between the first-PDA transceiver 6a and the projection-system transceiver 8. In each of these cases, the MAC 34 of the communication/control unit 32 is used to coordinate the link.

The present invention thereby supports a variety of presentation modes including, for example, a single-user presentation, a multi-user presentation, a multi-user collaboration on a single document or on multiple documents, inter-user communication through email and document exchange, and the connection of conferees to a local LAN, WAN or the Internet. The MAC 34 provides a flexible means of controlling the flow of information and control among the users. The MAC 34 connects to the projection apparatus of the projector to allow individual conferees at the PDA's 4a–c to add their material to the projected image 14 for display to be seen by all conferees; this form of collaboration is commonly known as "whiteboarding."

The MAC 34 is also able to allow multiple conferees to share access to the projector 12 simultaneously, thereby allowing simultaneous collaboration on a single document. The MAC 34 contains logic to handle the simultaneous use of the projector resource 12 by many users, in a rule-based method similar to that used by "whiteboarding" software models as included in video or audio conferencing. Typically, the rules would be known to all users (e.g., some kind of precedence order for gaining control of the common display elements, such as the cursor, or to use different color "ink" for each person, etc.). Also there may be a "moderator" who takes precedence and resolves disputes among the users.

The MAC 34 is also able to connect individual conferees at the PDA's 4a–4c to each other for private data transfers. The MAC 34 also enables connection of any conferee to a nearby wired network, e.g. Ethernet, by means of a wired cable 18 (or alternatively an RF link) from the projection system 10 to a local Ethernet connection. Alternatively, this Ethernet connection itself may be made wirelessly as part of this invention where the Ethernet access point is configured like another mobile user and connected to the central MAC 34 inside the projection system 10.

According to another aspect of the present invention, the "appliance" nature of the PDA's 4*a*–4*c* may be exploited to enhance the efficiency to data transfer in the network. That is, the PDA's 4*a*–4*c* can process information differently from existing PC platforms. Portable PC-type platforms typically manipulate data in source format (e.g. Power-Point™ objects), and then before display such object-oriented information is passed to a graphics chip that is generally present in a PC for conversion to a raster-scanned format such as VGA or DVI. The high-bandwidth VGA or DVI signal output by the graphics chip is then passed to a "dumb" display device such as a CRT. For example, in FIG. 2 the output from the graphics chip 24 is passed to a local display 30, which may be a CRT.

According to this aspect of the present invention, the PDA appliance 4*a* may include only a simple low-cost graphics function (e.g., only good enough to create a low-resolution image on the local display of the PDA 4*a*). Alternatively, the PDA appliance 4*a* may include a high-performance graphics function and also a MUX 22 to select sending either a high-speed uncompressed output of the graphic chip or the low-speed object-oriented compressed signal (input to the graphic chip) across the RF link via the transceiver 6*a*. Thus the PDA cost can be reduced, and at the same time lower-bandwidth object data can be passed over the RF link to the projector 12. By the use of lower-bandwidth links, either the cost of the radio transceivers 6*a*, 8 can be reduced, more users can be active, and/or the distance between PDA's 4*a* c and the projection system 10 can be increased. The projection system 10 includes a graphics chip 46 to carry out the conversion of object oriented data to raster scan format for all the multiple users of the digital projector 12. By including application-aware object-to-raster conversion software in the graphics chip 46, object-oriented compressed files transmitted across the RF link from the PDA transceiver 6*a* to the projection system transceiver 8 can be automatically uncompressed (rasterized) for display purposes.

Alternatively the PDA's 4*a*–*c* may be replaced with laptops (or mini-laptops) running conventional operating systems. According to the present invention, the PDA's 4*a*–4*c* may be replaced by a data appliance with a range of capabilities from a simplified PDA to a state-of-the-art laptop computer.

The present invention eliminates the need for a wired connection to the conferees. The PDA transceiver 6*a* and the projection-system transceiver 8, which determine the RF link, are available from conventional technology. For example, the Hyperlan (High Performance Radio Local Area Network) standard can provide a preferred embodiment with a maximal data rate in the range of 20–54 Mbits/sec. ("HIPERLAN: the high performance radio local area network standard", Hallis, G. A., Electronics & Communications Engineering Journal, December 1994, pp. 289–296; "HiperLAN/2—The Broadband Radio Transmission Technology Operating in the 5 GHz Frequency Band", M. Johnsson, HiperLAN/2 Global Forum, 1999.) The preferred transmission frequency bands are in the UNII band at approximately 5 GHz and the distances correspondingly enabled by such frequency bands may be as large as 10 to 100 M depending on other operating conditions. The aggregate bandwidth provided by the RF connection may be separated into channels by the MAC 34 as needed depending the bandwidth of the data. Such data may be either static or semi-static (in the case of PowerPoint™ or Excel™), or video/moving images.

In a preferred embodiment the present invention can be used in a setting such as a conference facility with a central digital projector 12 with a central base station RF controller (i.e., MAC 34) and logic to handle multiple simultaneous users through individual PDA appliances 4*a*–4*c*. However alternative embodiments are also within the scope of the present invention. Instead of a single projector 12, multiple central projectors networked with RF or wired connections may be employed. Instead of a digital projector 12, the central projector may be a conventional analog data projector such as those used before digital projectors became popular. The central controller (or MAC 34) may be located in another box removed from the projection system 10. Additionally the combination the projector 12 and screen 16 may replaced by a flat panel display system.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A communications and data display system for a multi-user meeting comprising:
    a projection system for displaying a shared image upon a shared screen, the projection system including a projector wireless transceiver and a controller; and
    at least first and second data appliances each operable independent of the shared screen to display at least a portion of the shared image thereat, the first and second data appliances respectively including first and second wireless transceivers, wherein:
        the first and second wireless transceivers are independently operable to transfer and receive graphical image data of the shared image to and from the projector wireless transceiver;
        the projection system displays the shared image responsive to the graphical image data; and
        the transfer of the graphical image data and display of the shared image are controlled by the controller using first control data;
        whereby the first and second data appliances provide a capability to simultaneously modify the same shared image and transfer the modified image.

2. The communications and data display system of claim 1, wherein:
    the first wireless transceiver transfers a first signal to the projector wireless transceiver;
    the projector wireless transceiver transfers the first signal to the second wireless transceiver; and
    the transfer of the first signal from the first data appliance to the second data appliance is controlled by the controller using second control data.

3. The communications and data display system of claim 2, wherein:
    the second wireless transceiver transfers a second signal to the projector wireless transceiver;
    the projector wireless transceiver transfers the second signal to the first wireless transceiver; and
    the transfer of the second signal from the second data appliance to the first data appliance is controlled by the controller using the second control data.

4. The communications and data display system of claim 2, wherein the second control data includes at least one of:
    projector control data of the projection system;

a first control signal of the first data appliance transferred from the first wireless transceiver to the controller via the projector wireless transceiver; and a second control signal of the second data appliance transferred from the second wireless transceiver to the controller via the projector wireless transceiver.

5. The communications and data display system of claim 1, wherein:

the projection system further comprises an interface to an external network;

the first wireless transceiver transfers a first signal to the projector wireless transceiver;

the projector wireless transceiver transfers the first signal to the external network; and the transfer of the first signal from the first data appliance to the external network is controlled by the controller using third control data.

6. The communications and data display system of claim 5, wherein:

the external network transfers a second signal to the projector wireless transceiver;

the projector wireless transceiver transfers the second signal to the first wireless transceiver; and the transfer of the second signal from the external network to the first data appliance is controlled by the controller using the third control data.

7. The communications and data display system of claim 5, wherein the third control data includes at least one of:

projector control data of the projection system;

a first control signal of the first data appliance transferred from the first wireless transceiver to the controller via the projector wireless transceiver; and an external control signal of the external network transferred to the controller via the interface to the external network.

8. The communications and data display system of claim 1, wherein:

the first data appliance further comprises a graphics chip, a processing unit, a memory and a MUX;

the processing unit takes keyboard input from a local keyboard;

the processing unit takes memory graphics input from the memory and provides processing-unit memory output to the memory;

the processing unit provides processing-unit graphics output to the graphics chip and to the MUX;

the processing unit provides processing-unit control output to the MUX;

the graphics chip provides graphics-chip output to a local display and to the MUX; and the MUX provides MUX output to the first wireless transceiver, the MUX output having a compression format selected from the group consisting of compressed and uncompressed.

9. The communications and data display system of claim 1, wherein:

the projection system further comprises a graphics converter and a projector;

the graphics converter receives the graphical image data from the projector wireless transceiver and transfers uncompressed graphical image data to the projector; and the projector displays the shared image responsive to the uncompressed graphical image data.

10. The communications and data display system of claim 9, wherein the graphics converter includes an application-aware graphics chip that transforms compressed graphics data to the uncompressed graphics data.

11. The communications and data display system of claim 10, wherein:

the compressed graphical image data includes compressed motion graphics or video data; and the uncompressed graphical image data includes uncompressed motion graphics or video data.

12. The communications and data display system of claim 1, wherein the first control data includes at least one of:

projector control data of the projection system; and a first control signal of the first data appliance transferred from the first wireless transceiver to the controller via the projector wireless transceiver.

13. The communications and data display system of claim 1, wherein the graphical image data is transferred at frequencies of approximately 5 GHz.

14. A communications and data display system for a multi-user meeting comprising:

a projection system for displaying a shared image upon a shared screen, the projection system including a projector wireless receiver and a controller; and at least first and second data appliances each operable independent of the shared screen to display at least a portion of the shared image thereat, the first and second data appliances respectively including first and second wireless transmitters, wherein:

the first and second wireless transmitters are independently operable to transfer and receive graphical image data of the shared image to and from the projector wireless receiver;

the projection system displays the shared image responsive to the graphical image data; and the transfer of the graphical image data and display of the shared image are controlled by the controller using control data;

whereby the first and second data appliances provide a capability to simultaneously modify the same shared image and transfer the modified image.

15. The communications and data display system of claim 14, wherein:

the first data appliance further comprises a graphics chip, a processing unit, a memory and a MUX;

the processing unit takes keyboard input from a local keyboard;

the processing unit takes memory graphics input from the memory and provides processing-unit memory output to the memory;

the processing unit provides processing-unit graphics output to the graphics chip and the MUX;

the processing unit provides processing-unit control output to the MUX;

the graphics chip provides graphics-chip output to a local display and to the MUX; and the MUX provides MUX output to the first wireless transmitter, the MUX output having a compression format selected from the group consisting of compressed and uncompressed.

16. The communications and data display system of claim 14, wherein:

the projection system further comprises a graphics converter and a projector;

the graphics converter receives the graphical image data from the projector wireless receiver and transfers uncompressed graphical image data to the projector; and the projector displays the shared image responsive to the uncompressed graphical image data.

17. The communications and data display system of claim 16, wherein the graphics converter includes an application-aware graphics chip that transforms graphics compressed graphics data to the uncompressed graphics data.

18. The communications and data display system of claim 14, wherein the control data includes at least one of:
projector control data of the projection system; and
a first control signal of the first data appliance transferred from the first wireless transmitter to the controller via the projector wireless receiver.

19. The communications and data display system of claim 14, wherein the graphical image data is transferred at frequencies of approximately 5 GHz.

20. A method for communication and data display for a multi-user meeting, comprising:
transmitting and receiving graphical image data of a shared image from at least one of first and second wireless transceivers of respective first and second data appliances to and from a projector wireless transceiver of a projection system;
displaying the shared image upon a shared screen responsive to the graphical image data with the projection system;
displaying at each of the first and second data appliances independent of the shared screen at least a portion of the shared image; and
controlling the transmitting of the graphical image data and the displaying of the shared image with a controller using first control data;
whereby the first and second data appliances provide a capability to simultaneously modify the same shared image and transfer the modified image.

21. The method of claim 20, further comprising:
transmitting a first signal from the first wireless transceiver to the projector wireless transceiver;
transmitting the first signal from the projector wireless transceiver to the second wireless transceiver of the second data appliance; and
controlling the transmission of the first signal from the first data appliance to the second data appliance with the controller using second control data.

22. The method of claim 21, further comprising:
transmitting a second signal from the second wireless transceiver to the projector wireless transceiver;
transmitting the second signal from the projector wireless transceiver to the first wireless transceiver; and
controlling the transmission of the second signal from the second data appliance to the first data appliance with the controller using the second control data.

23. The communications and data display system of claim 21, wherein the second control data includes at least one of:
projector control data of the projection system;
a first control signal of the first data appliance transferred from the first wireless transceiver to the controller via the projector wireless transceiver; and
a second control signal of the second data appliance transferred from the second wireless transceiver to the controller via the projector wireless transceiver.

24. The method of claim 20, further comprising:
transmitting a first signal from the first wireless transceiver to the projector wireless transceiver;
transmitting the first signal from the projector wireless transceiver to an external network, the projection system including an interface to the external network; and
controlling the transmission of the first signal from the first data appliance to the external network with the controller using third control data.

25. The method of claim 24, further comprising:
transmitting a second signal from the external network to the projector wireless transceiver;
transmitting the second signal from the projector wireless transceiver to the first wireless transceiver; and
controlling the transmission of the second signal from the external network to the first data appliance with the controller using the third control data.

26. The communications and data display system of claim 24, wherein the third control data includes at least one of:
projector control data of the projection system;
a first control signal of the first data appliance transferred from the first wireless transceiver to the controller via the projector wireless transceiver; and
an external control signal of the external network transferred to the controller via the interface to the external network.

27. The method of claim 20, further comprising:
transmitting a keyboard input from a local keyboard to the first data appliance;
converting compressed graphical image data to uncompressed graphical image data at the first data appliance; and
controlling a flow of uncompressed graphical image data and compressed graphical image data to the first wireless transceiver.

28. The method of claim 27, wherein:
the compressed graphical image data includes compressed motion graphics or video data; and
the uncompressed graphical image data includes uncompressed motion graphics or video data.

29. The method of claim 20, further comprising:
converting compressed graphical image data to uncompressed graphical image data at the projection system;
controlling a flow of uncompressed graphical image data to a projector of the projection system; and
using the projector to display the shared image responsive to the uncompressed graphical image data.

30. The method of claim 29, wherein converting compressed graphical image data to uncompressed graphical image data includes using an application-aware graphics chip to transform compressed graphical image data to uncompressed graphical image data.

31. The communications and data display system of claim 20, wherein the first control data includes at least one of:
projector control data of the projection system; and
a first control signal of the first data appliance transferred from the first wireless transceiver to the controller via the projector wireless transceiver.

32. The method for communication and data display of claim 20, wherein the graphical image data is transferred at frequencies of approximately 5 GHz.

* * * * *